T. AND A. MOHN.
PISTON RING.
APPLICATION FILED MAY 23, 1919.
1,401,178.
Patented Dec. 27, 1921.
2 SHEETS—SHEET 1.
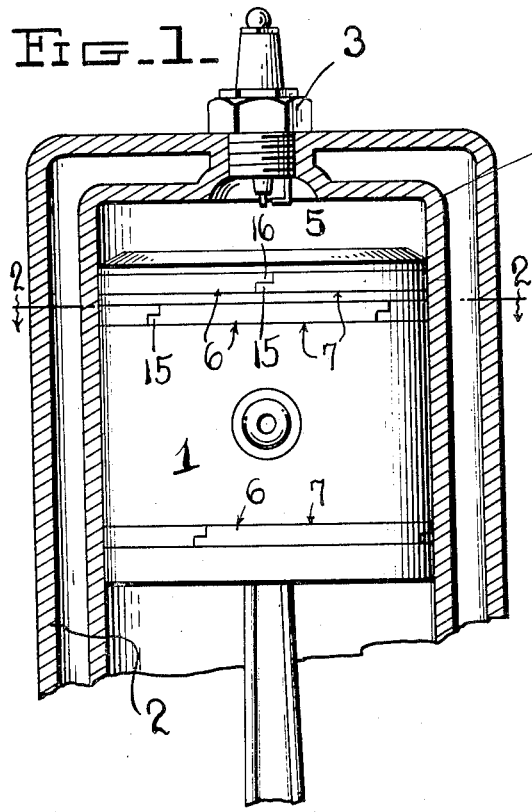
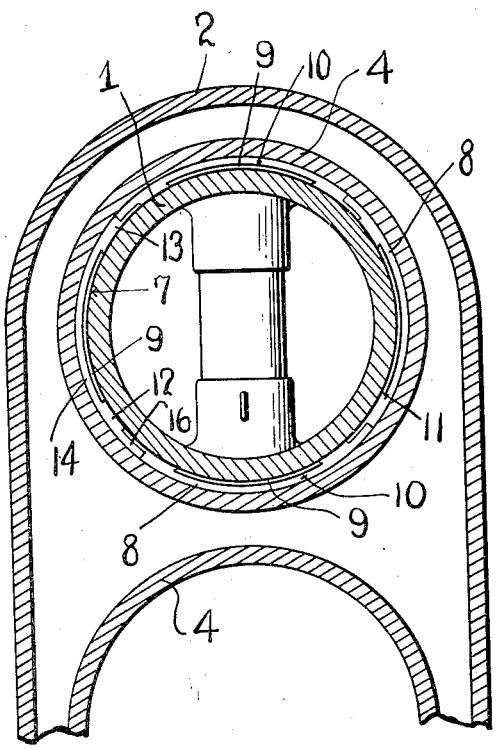
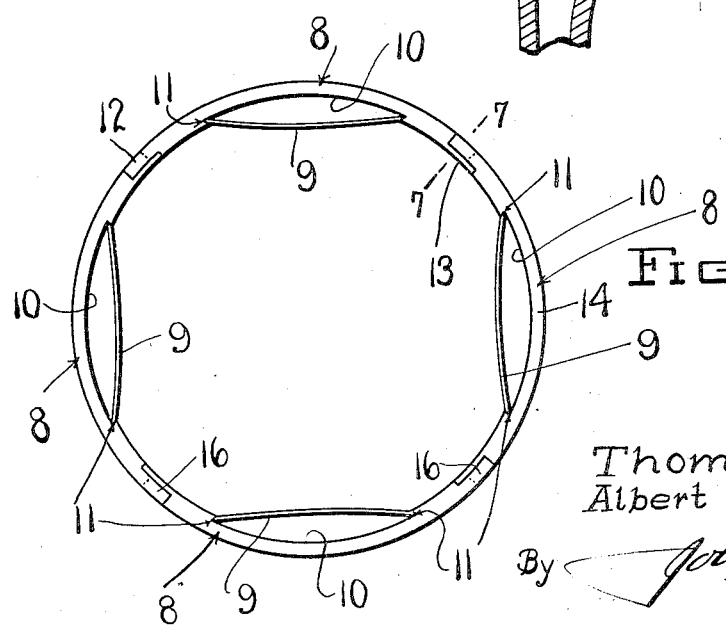
Inventors
Thomas Mohn &
Albert Mohn
By *John F. Duffie*
Attorney

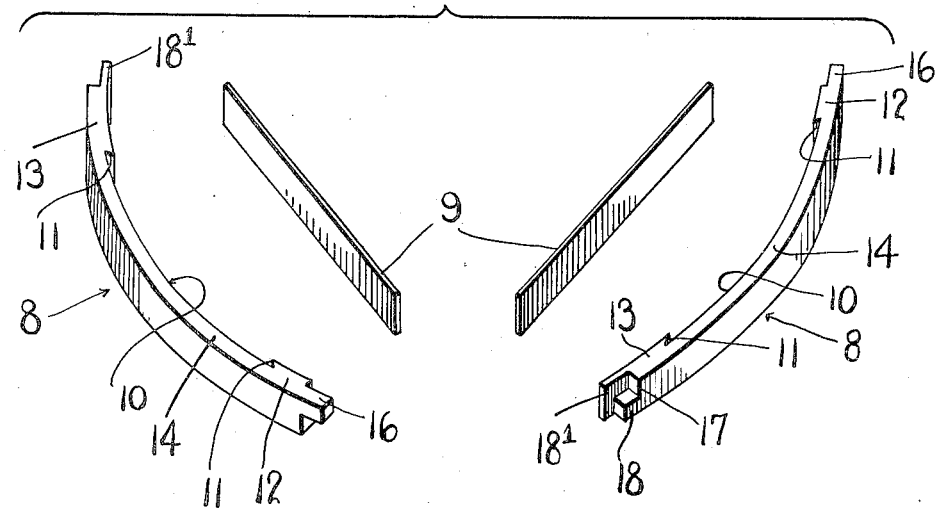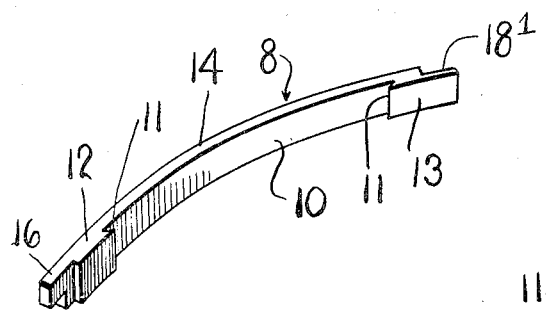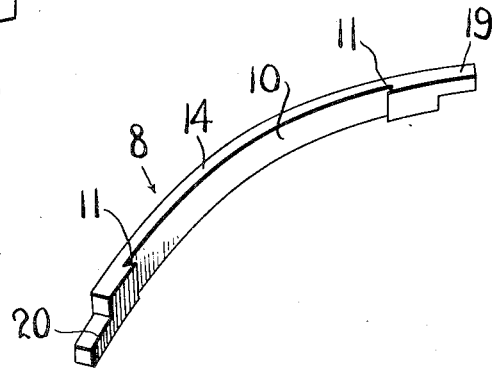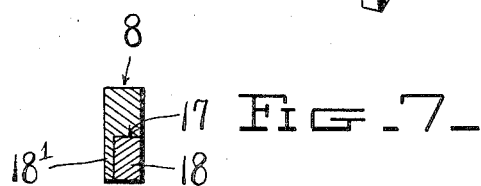

UNITED STATES PATENT OFFICE.

THOMAS MOHN AND ALBERT MOHN, OF RED WING, MINNESOTA.

PISTON-RING.

1,401,178.　　　Specification of Letters Patent.　　Patented Dec. 27, 1921.

Application filed May 23, 1919. Serial No. 299,249.

*To all whom it may concern:*

Be it known that we, THOMAS MOHN and ALBERT MOHN, citizens of the United States, residing at Red Wing, in the county of Goodhue and State of Minnesota, have invented certain new and useful Improvements in Piston-Rings, of which the following is a specification.

This invention relates to new and useful improvements in sectional piston rings.

One object of our invention is to provide a piston ring which is constructed or composed of a plurality of corresponding sections which are pressed tightly against the cylinder wall through the use of springs or other resilient means whereby the ring is rendered leak-proof.

A further object of this invention is to provide a piston ring possessing sufficient flexibility or resiliency to compensate for any irregularities or wear in the cylinder wall.

With the foregoing and other objects in view that will appear as the nature of the invention is better understood the same consists in the novel features of construction, combination and arrangement of parts illustrated in the drawings and more particularly pointed out in the appended claim.

In the accompanying drawings:—

Figure 1 is a fragmentary sectional view of the piston and cylinder of an automobile or other internal combustion engine.

Fig. 2 is a horizontal section, taken on the plane indicated by the dotted lines 2—2 of Fig. 1.

Fig. 3 is a plan view of one of the piston rings complete.

Fig. 4 is a detail perspective view of the piston ring, with the several component parts shown in juxtaposition.

Fig. 5 is a detail perspective view of one of the piston ring sections.

Fig. 6 is a similar view, showing a modified form of joint and Fig. 7 is a detail transverse section, taken on line 7—7 of Fig. 3, with the parts represented on an enlarged scale.

Referring to the drawings for a more particular description of the invention and which drawings are for illustrative purposes only and are therefore not drawn to scale, the numeral 1 represents the piston of an internal combustion engine of the type used in automobiles, 2 the piston cylinder, 3 the spark plug, 4 the wall of the combustion chamber 5 in which the piston reciprocates and 6 our improved piston rings, which constitute the subject matter of this invention. The piston rings fit in annular grooves or channels 7 in the outer wall or surface of the piston, in the usual manner.

In carrying out our invention, each piston ring is constructed of four or more corresponding expansible sections 8, which are pressed tightly against the wall 4 of the combustion chamber 5 of the engine cylinder by the flat springs 9. The springs 9 fit in corresponding arcuate recesses 10 formed in the inner walls or faces of the piston ring sections, with their opposite ends seating against the inwardly inclined shoulders 11 formed at the ends of said arcuate recesses. It is obvious that should the piston be removed from the cylinder for any reason, the tendency of the springs 9 is to expand outwardly, but the form of the shoulders 11 will limit this expansion to the position illustrated in Fig. 3 with the result that said springs will be retained in place. However, should a spring become worn or defective in any way, it can be easily removed by a lateral movement and replaced by a new spring.

The ends 12 and 13 of the ring sections are of greater thickness than the intermediate recessed portions 14 thereof, and a leak-proof joint or connection 15 is established between the adjacent ends of the several respective sections in the following manner. The end 12 of each ring section is formed with a longitudinally projecting upper tongue 16 which is of somewhat less thickness and width than said end, while the opposite end 13 of each ring section is formed in its upper outer corner with a stepped recess 17, leaving a relatively shorter lower tongue 18 and the relatively narrow projecting lip 18[1] which is of a width corresponding to that of the ring section and renders the latter leak-proof at the joint. The piston ring sections are arranged in position on the piston with the end 12 of one section opposed to the end 13 of an adjacent section and when fitted together, the longer and shorter tongues 16 and 18 overlap each other and practically form one continuous ring, while at the same time sufficient flexibility is allowed to take up or compensate for any irregularities or wear in the wall 4 of the cylinder.

In the modification shown in Fig. 6 of the drawings, the ring sections are formed at opposite ends with upper and lower tongues 19 and 20 which are of the same length as each other and of equal thickness with the ends of the sections. In this form of joint, the several ring sections are arranged with the tongues 19 and 20 of the respective sections overlapping each other.

From the foregoing description taken in connection with the drawings, it is thought that the construction, operation and advantages of this invention will be readily understood without requiring a more extended explanation.

Having described our invention, what we claim as new and desire to secure by Letters Patent, is:—

A piston ring comprising a plurality of ring sections, the adjacent sections having overlapping end portions, each section being provided at its inner side with a recess having undercut end walls, the said walls converging toward each other toward the center of the ring and a flat spring bridging the recess and bearing at its ends against the undercut converging end walls of the recess.

In testimony whereof we affix our signatures.

THOMAS MOHN.
ALBERT MOHN.